United States Patent [19]

Radun et al.

[11] Patent Number: 5,327,069
[45] Date of Patent: Jul. 5, 1994

[54] SWITCHED RELUCTANCE MACHINE INCLUDING PERMANENT MAGNET STATOR POLES

[75] Inventors: Arthur V. Radun, Ballston Lake, N.Y.; Eike Richter, Cincinnati, Ohio

[73] Assignee: General Electric Company, Cincinnati, Ohio

[21] Appl. No.: 901,472

[22] Filed: Jun. 19, 1992

[51] Int. Cl.⁵ ............................................. H02K 29/00
[52] U.S. Cl. ......................................... 322/10; 322/94; 318/138; 318/701
[58] Field of Search .................... 322/10, 94; 310/42, 310/152, 154, 168, 181; 318/138, 701, 702

[56] References Cited

U.S. PATENT DOCUMENTS

| | | | |
|---|---|---|---|
| 3,678,352 | 7/1972 | Bedford | 318/138 |
| 3,984,711 | 10/1976 | Kordik | 310/181 X |
| 4,143,308 | 5/1979 | Deplante et al. | 318/138 |
| 4,387,326 | 6/1983 | Ray et al. | 318/138 |
| 4,595,865 | 6/1986 | Jahns | 318/254 |
| 4,684,867 | 8/1987 | Miller et al. | 318/701 |
| 4,712,028 | 12/1987 | Horber | 310/49 |
| 4,713,570 | 12/1987 | Mastromattei | 310/156 |
| 4,763,034 | 8/1988 | Gamble | 310/181 |
| 4,763,056 | 8/1988 | Byrne et al. | 318/701 |
| 4,772,839 | 9/1988 | MacMinn et al. | 318/696 |
| 4,896,088 | 1/1990 | Jahns | 318/696 |
| 4,922,604 | 5/1990 | Marshall et al. | 29/598 |
| 4,995,159 | 2/1991 | Hancock et al. | 29/596 |
| 5,008,572 | 4/1991 | Marshall et al. | 310/45 |
| 5,059,884 | 10/1991 | Shah et al. | 318/701 |
| 5,075,610 | 12/1991 | Harris | 318/701 |
| 5,084,662 | 1/1992 | Palaniappan et al. | 318/701 |
| 5,115,181 | 5/1992 | Sood | 318/701 |
| 5,138,244 | 8/1992 | Bahn | 318/701 |

FOREIGN PATENT DOCUMENTS 2813701 3/1977 Fed. Rep. of Germany .
472505 9/1937 United Kingdom .

*Primary Examiner*—Kristine L. Peckman
*Attorney, Agent, or Firm*—Bernard E. Shay; Jerome C. Squillaro

[57] ABSTRACT

A switched reluctance machine comprising a housing, a stator attached to the housing and a rotor mounted within the housing. The stator including teeth wound with electrical coils which are connected to form phase windings. The rotor comprising a series of laminates including teeth pressed onto a shaft. According to the present invention, at least one set of opposing phase wound stator teeth comprise permanent magnets.

8 Claims, 8 Drawing Sheets

VOLTAGE CONTRIBUTION VS SPEED

1

SWITCHED RELUCTANCE MACHINE INCLUDING PERMANENT MAGNET STATOR POLES

The present invention relates, in general, to switched reluctance motors and, more particularly to a novel switched reluctance machine including permanent magnet stator teeth.

BACKGROUND OF THE INVENTION

Known generators adaptable for use in aircraft engines include flux switch generators, permanent magnet generators, Lundell Permanent Magnet Generators, Wound Rotor Synchronous Generators, Homopolar Generators, Hybrid Homopolar Generators, Slave Regulated Generators and Switched Reluctance Machines. Switched reluctance (SR) machines conventionally have multiple poles on both the stator and rotor; that is, they are doubly salient. In switched reluctance machines, there is a concentrated winding on each of the stator poles, but no windings or magnets on the rotor. Each pair of diametrically opposed stator pole windings is connected in series or parallel to form an independent machine phase winding of the multiphase SR machine. Torque is produced by switching current in each machine phase winding in a predetermined sequence that is synchronized with angular position of the rotor, so that a magnetic force of attraction results between the rotor poles and stator poles. Current is switched off in each phase before the rotor poles rotate past the aligned position. The torque developed is independent of the direction of current flow, so that unidirectional current pulses synchronized with rotor movement can be applied to the stator pole windings by an inverter using unidirectional current switching elements, such as transistors or thyristors. For use as a generator, the current pulses in each machine phase winding are simply shifted so that current flows when the rotor poles are moving past alignment towards the unaligned position.

A SR motor drive or generator system operates by switching the machine phase currents on and off in synchronism with rotor position. That is, by properly positioning the firing pulses relative to rotor angle, forward or reverse operation and motoring or generating operation can be obtained. Usually, the desired phase current commutation is achieved by feeding back a rotor position signal to a controller from a shaft angle transducer, e.g. an encoder or a resolver. However, in order to reduce size, weight and cost in SR motor drives and generating systems, techniques for indirect rotor position sensing have been developed, thus eliminating the need for a shaft angle transducer. Current regulators are typically employed for controlling phase current amplitudes in a SR machine.

Control Alternators used in present day aircraft engines are normally driven by the engine shaft and, as a result the output may be subject to voltage variations of 10 to 1. Therefore, voltage from the permanent magnet generators used for this purpose can not be regulated easily. If an SCR controlled rectifier system is used to maintain constant output voltage from 10% speed to 105% speed, the rectifiers must be large enough to block the high voltages generated at top engine speed. Further, a failure in the controlled rectifier may expose the rest of the electrical circuitry to excessive voltages. Alternatively, a "shunt regulator" may be used at high speeds to short the alternator such that only a percentage (e.g., 10%) of the generated voltage reaches the electrical circuitry. A failure in the solid state switches of a shunt regulator (controlled rectifier) does not expose the other circuitry to high voltages because the alternator output is effectively shorted. Therefore, the alternator must be designed to handle continuous short circuit operation in the event of a failure.

It would, therefore, be advantageous to design a switched reluctance machine which does not expose the low voltage electronic circuitry to high voltages in the event of a failure, nor does it expose the generator to continuous short circuit operation and excessive temperatures.

It will also be noted that, starting a conventional switched reluctance generator normally requires a battery or other power source to energize the phase windings.

SUMMARY OF THE INVENTION

A switched reluctance machine comprising a housing, a stator attached to the housing and a rotor mounted within the housing. The stator including teeth wound with electrical coils which are connected in phase windings. The rotor comprising a series of laminates including teeth pressed onto a shaft. According to the present invention, at least one set of opposing phase wound stator teeth comprise permanent magnets.

Further, according to the present invention, the phase windings of the magnetic stator teeth are connected in series and the series combination is connected to an SCR-diode bridge circuit which, in turn, is connected in parallel with a switch. In an alternate embodiment of the present invention, the switch may be a capacitor. The diode bridge—switch combination is connected to conventional control circuitry adapted to adjust the output voltage of the switched reluctance generator.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
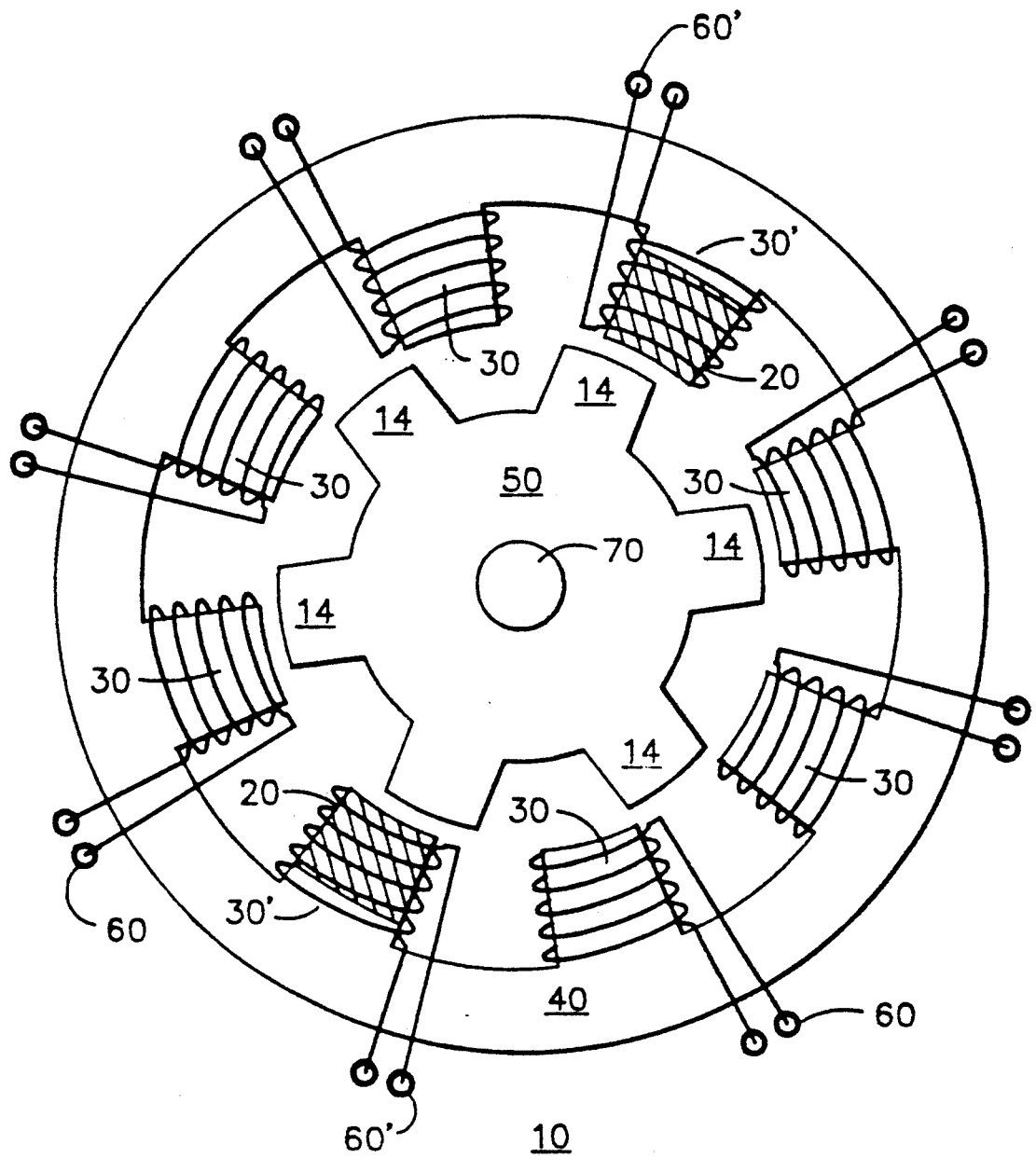
FIG. 1 illustrates a switched reluctance machine including stator magnets according to one embodiment of the present invention.

In FIG. 1, a switched reluctance machine 10 according to the present invention includes permanent magnets 20 on two opposing stator teeth 30' of a switched reluctance stator 40. Switched reluctance machine 10 includes a stator 40 having multiple stator teeth 30. Each opposing pair of stator teeth forms a pole of the switched reluctance machine. Rotor 50, which is mounted on shaft 70, includes multiple rotor teeth 14. Each of stator teeth 30 includes windings 60. Stator teeth 30' include permanent magnets 20 which create a magnetic field adapted to generate voltage in coils 60 as rotor 50 turns. Voltage is generated by the changes in reluctance between stator teeth 30' which changes the magnetic field in coils 60', inducing voltage therein. In the stator, magnets are fastened to the stator laminations. Various fastening methods can be employed, depending upon the vibration exposure. Encapsulating the magnets into a nonmagnetic holding fixture such as a thin titanium band fastened to the laminations is one method.

The voltage generated in coils 60' excites coils 60 on the other stator teeth through one of the circuits illustrated in FIGS. 4-7. In a switched reluctance machine of the type illustrated in FIG. 1, enough energy can be generated in coils 60' at start up to excite windings 60 which, in turn, generate electricity from the motion of rotor 50.

Figure 2:
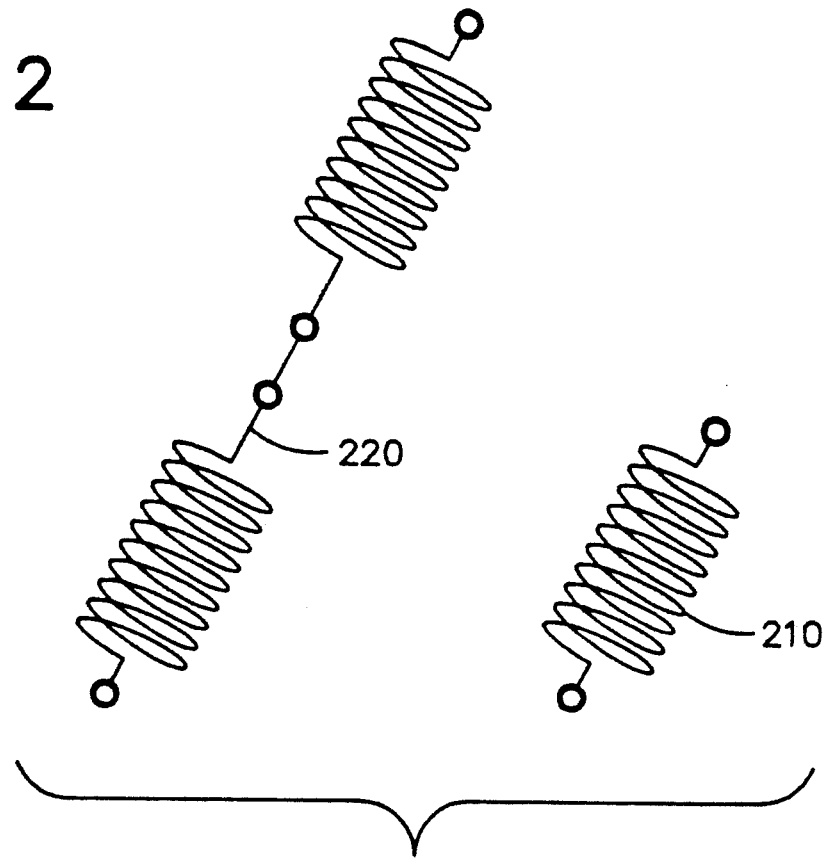
FIG. 2 illustrates a single phase winding and a series phase winding.

In FIG. 2, coil 210 is a primary phase winding which may represent any one of coils 60 or 60' in FIG. 1. Coil 220 is a schematic representation of the series connection of two coils on opposing stator teeth 30 in FIG. 1. The series connection of coils 210 form an independent machine phase winding of the multiphase switched reluctance machine illustrated in FIG. 1.

Figure 3:
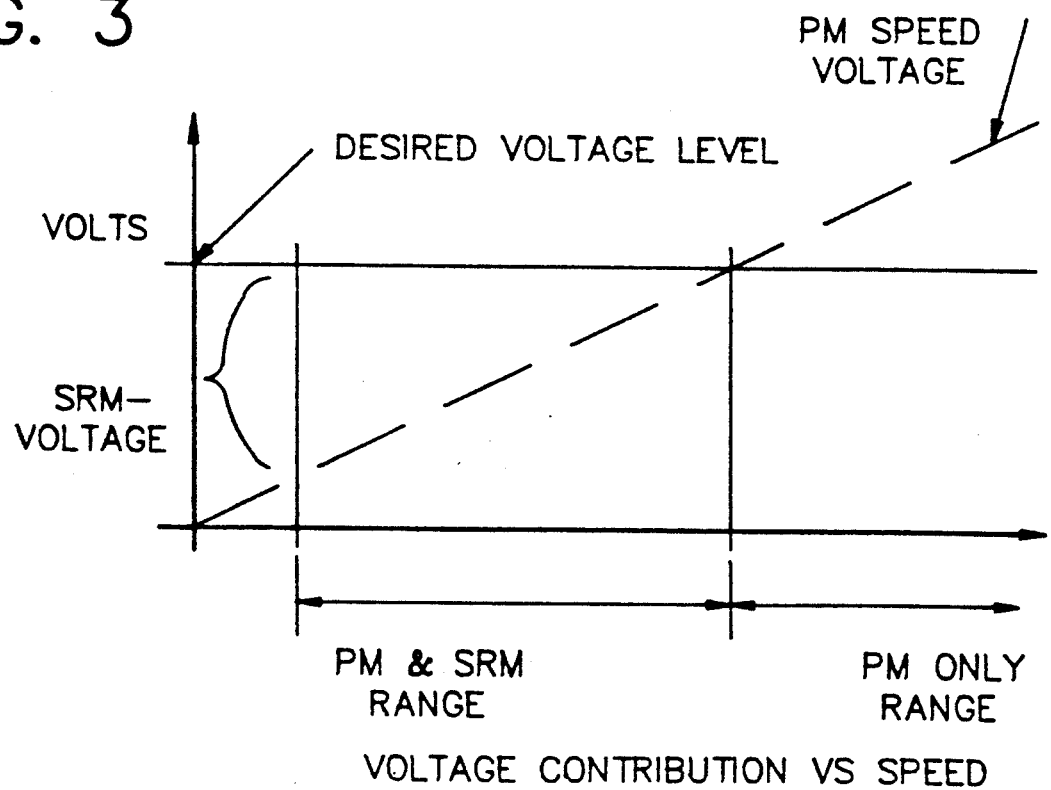
FIG. 3 is a plot of voltage output as a function of rotor speed for a switched reluctance generator according to the present invention.

In FIG. 3, the output voltage of the switched reluctance machine is plotted as a function of rotor speed. In a gas turbine engine wherein the rotor is driven by or geared to the engine core shaft, rotor speed is normally directly proportional to engine core speed. Therefore, changes in core speed result in changes in output voltage.

In a gas turbine engine, such as those used in jet engines, core speed may vary substantially, for example, between start up and full take off thrust. In the present application, engine speed will be described in percentages, 100% representing maximum rated speed and 0% representing full stop. The extreme range of engine speed makes it difficult to hold the output voltage of any associated generator within a predetermined range. The switched reluctance machine in FIG. 1 is designed such that the permanent magnet excitation of two of the 8 stator teeth, provide sufficient voltage above 85% speed.

Four different circuits to operate this generating system are illustrated in FIGS. 4-7. These circuits differ in the speed range to be covered, the size of the various components and startup of the switched reluctance section. They also differ in the number of switching elements, diodes, capacitors and connections between machine and electronics.

Figure 4:
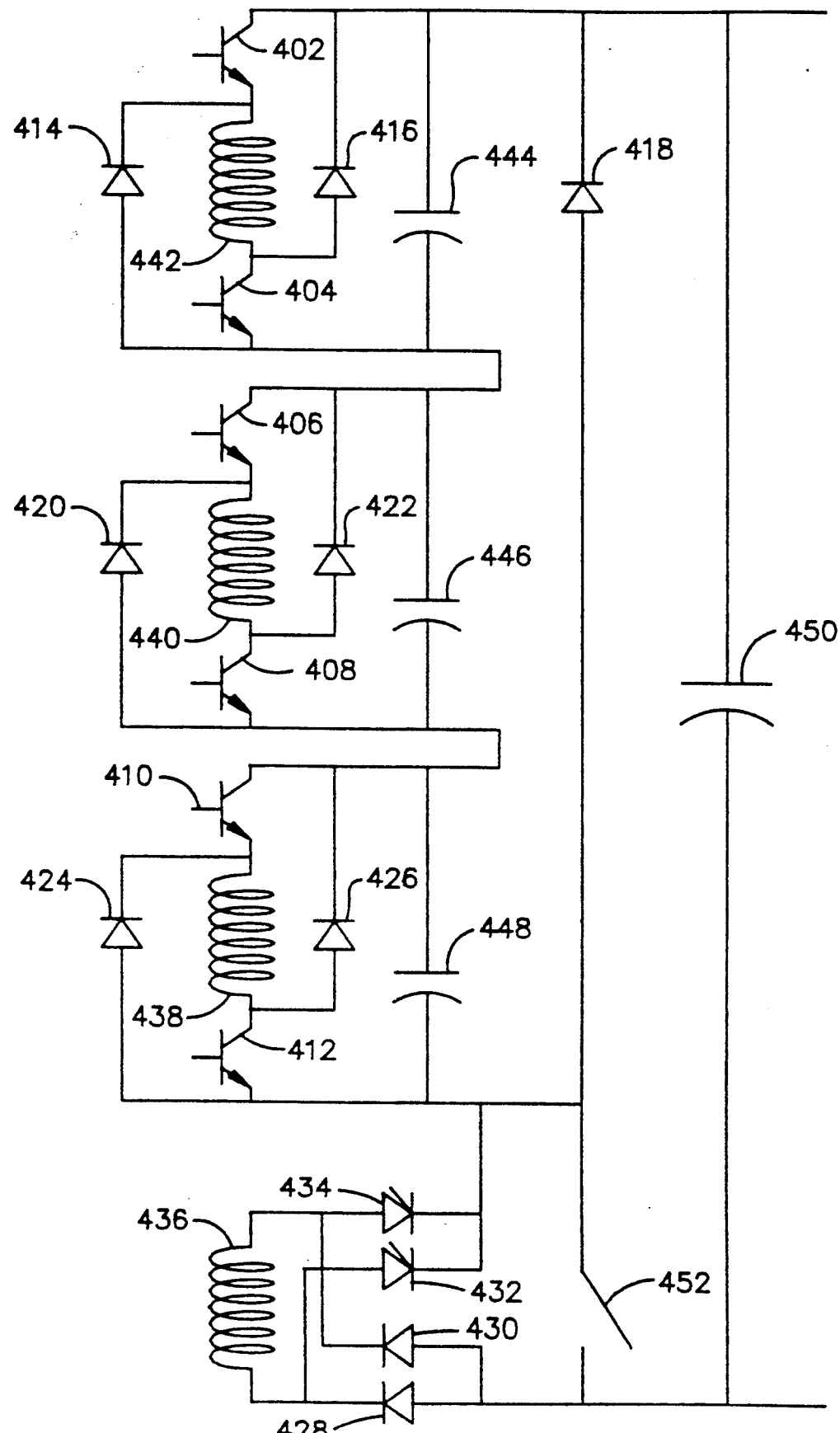
FIG. 4 is a schematic diagram of a voltage control circuit according to one embodiment of the present invention.

In FIG. 4, an SCR controlled rectifier bridge comprising diodes 428 and 430 along with SCR 432 and 434, maintains a constant voltage (e.g., 30 Vdc) across switch 452 which may be, for example, a transistor or a relay. In case of rectifier bridge failure the maximum machine open circuit voltage will be reduced to, for example, 1.2*30*1.414=51 volts from 10×30×1.414=424 volts, depending on the speed of rotor 50. At lower speeds the switched reluctance section of the system comprising, in FIG. 4, phase windings 442, 440 and 438 and their associated circuitry is started to provide additional voltage to maintain a predetermined voltage (e.g., 30 V) down to approximately 10% speed. Any failure in the switched reluctance circuitry will cause the additional voltage to collapse, thus making a higher voltage virtually impossible. The electrical machine of FIG. 1 is designed to operate with all windings at full excitation at the low speed end where the iron losses are small. At top speed only the magnetic phase winding 436 delivers power, thus reducing losses. Rotor 50 of FIG. 1 changes magnetization only twice per revolution and is excited only for 25% of the time. Therefore, this machine illustrated in FIG. 1 operates cooler than a conventional alternator for the same application.

In contrast to present day switched reluctance machines, a separate rotor position resolver is not required as the PMG signal from the magnetic phase winding (e.g. phase winding 436 in FIG. 4) can be used to provide proper switching signals. The Switched Reluctance-Permanent Magnet (SR-PM) machine is fundamentally simpler than the normal permanent magnet alternator.

In FIG. 4, the switched reluctance machine is started with switch 452 open and SCR's (silicon controlled rectifiers) 432 and 434 gated on. The voltage generated in permanent magnet coil 436 is imposed across output capacitor 450 through diode 418. As the rotor rotates, current induced in phase winding 436 is rectified through diode 418 charging capacitor 450. When capacitor 450 is charged, switch 452 is closed and SCR's 434 and 432 are turned off. With switch 452 closed, current from capacitor 450 charges capacitors 444, 446 and 448.

Once capacitor 450 is charged and switch 452 closed, phase winding 436 is effectively removed from the circuit. Therefore, with switch 452 closed, machine 10 of FIG. 1 works like a standard switched reluctance generator. In the phase represented by phase winding 442, electricity is generated by charging capacitor 444 with transistor switches 402 and 404 gated off. When a rotor tooth is aligned with the stator tooth including coil 442, transistor switches 402 and 404 are gated on providing a current path including phase winding 442 and capacitor 444. When this path is broken by turning off transistor switches 402 and 404 current will continue to flow through diodes 414 and 416, charging capacitor 444 and capacitor 450. Energy is added to the system by the change in reluctance as the rotor tooth is forced out of alignment with the stator tooth. Thus, through the combined action of phase windings 438, 440 and 442, output voltage is continuously generated across capacitor 450.

As the speed of the rotor is increased, the energy transmitted to the phase windings and thus the output voltage increases and, at some speed, the output voltage may exceed a predetermined limit. As the output voltage reaches an optimum level, it may be rectified and controlled by turning off the phase switches (e.g., transistors 402 and 404). If the output voltage becomes to large, the phase switches may be turned off completely. With the phase switches off, switch 452 may be opened and SCR's 432 and 434 gated on. The output voltage across capacitor 450 will then be supplied by phase winding 436. Alternatively, the energy supplied by the SR machine may be supplemented by the energy supplied by the PM machine. Since the output voltage may be reduced by limiting the on time of transistor/switches 402 and 404 and by opening switch 452, the output voltage may be accurately controlled over a wide range of rotor speed. Phase windings 438 and 440 generate energy through switches 406, 408, 410 and 412 and through diodes 420, 422, 424 and 426.

In FIG. 4, voltage from phase windings 438, 440 and 442 adds to generate the output across capacitor 450. The current output is the average of the current supplied by phase windings 438, 440 and 442.

The present invention is further advantageous in that the voltage generated across phase windings 436 is an accurate indicator of the position of rotor 50 of FIG. 1. Therefore, the timing for switches 402, 404, 406, 408, 410 and 412 may be controlled by measuring the voltage across phase winding 436.

Figure 5:
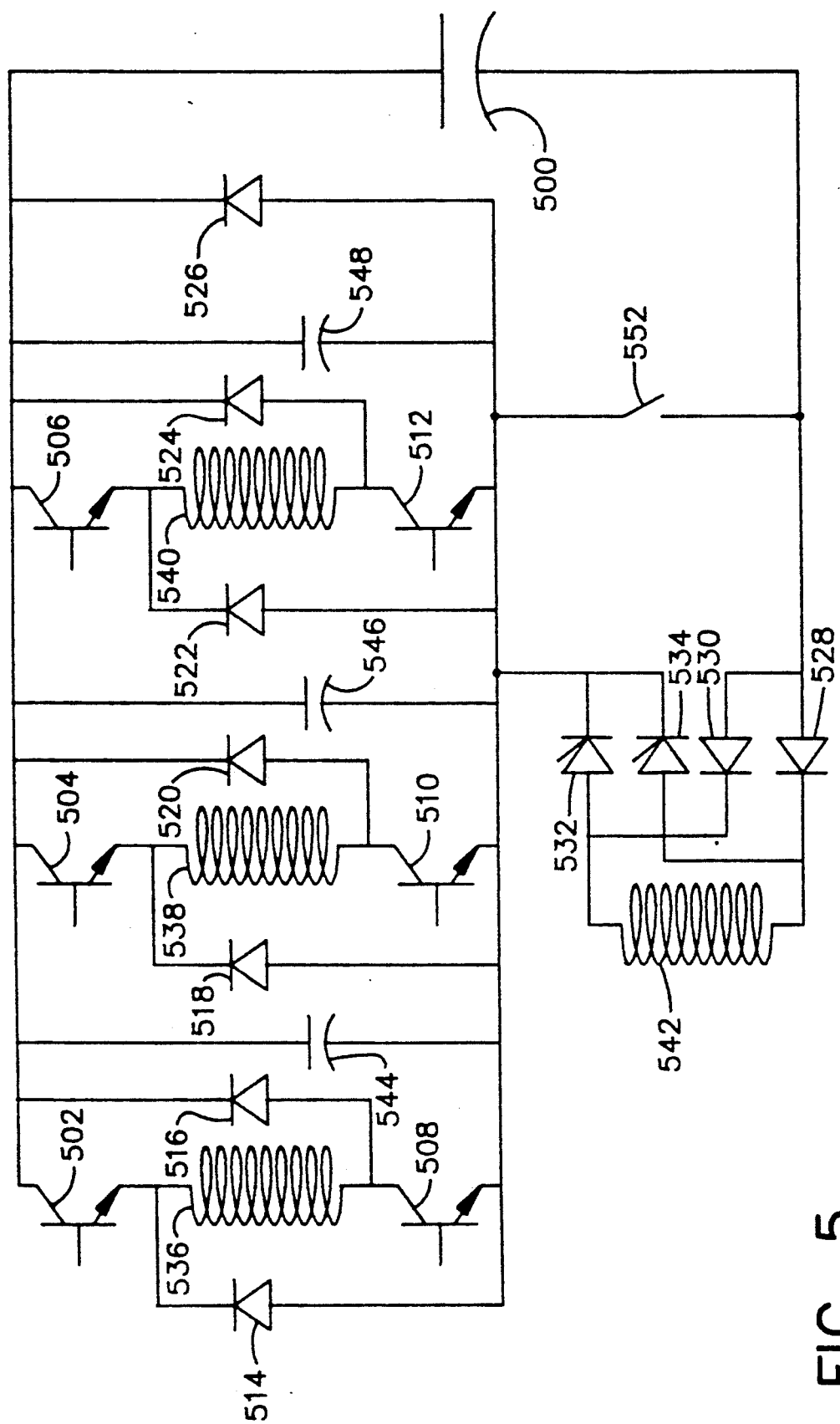
FIG. 5 is a schematic diagram of a voltage control circuit according to one embodiment of the present invention.

FIG. 5 is a further embodiment of control circuitry for the switched reluctance machine illustrated in FIG. 1. In FIG. 5, current from phase windings 536, 538 and 540 adds. The output voltage across capacitor 550 is the average voltage across the coils 536, 538 and 540. Each stator coil provides approximately ⅓ of the output current. In FIG. 5, the SR machine is charged during startup by opening switch 552 and turning on SCR's 532 and 534 to charge capacitor 550. Diodes 528 and 530 form a bridge with SCR 532 and 534. Capacitor 550 in turn charges capacitor's 544, 546 and 548 which excite phase windings 536, 538 and 540 through switches 502, 508, 504, 510, 506 and 512. Phase windings 514, 516, 518, 520, 522 and 524 add energy to capacitor 550 through diodes 514, 516, 518, 520, 522, 524 and 526.

Figure 6:
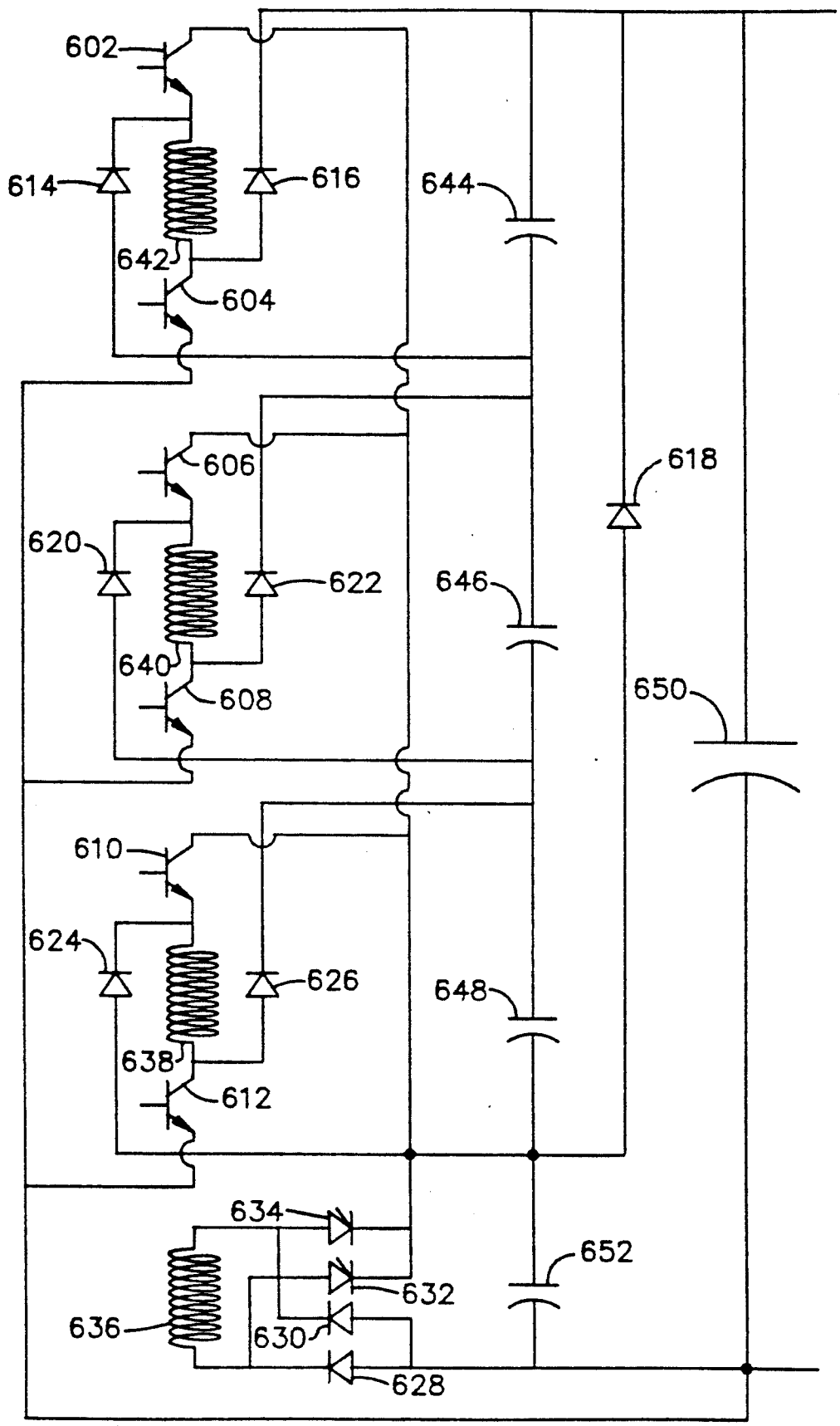
FIG. 6 is a schematic diagram of a voltage control circuit according to one embodiment of the present invention.

FIG. 6 is a further embodiment of control circuitry for the present invention. In FIG. 6, all excitation is provided by capacitor 652. Capacitor 650 acts as a smoothing or filtering capacitor. In FIG. 6, the startup switch (e.g., 452 and 552) is eliminated. In this embodiment, capacitor 650 does not require an initial charge since there is a separate excitation bus powered from capacitor 652.

Figure 7:
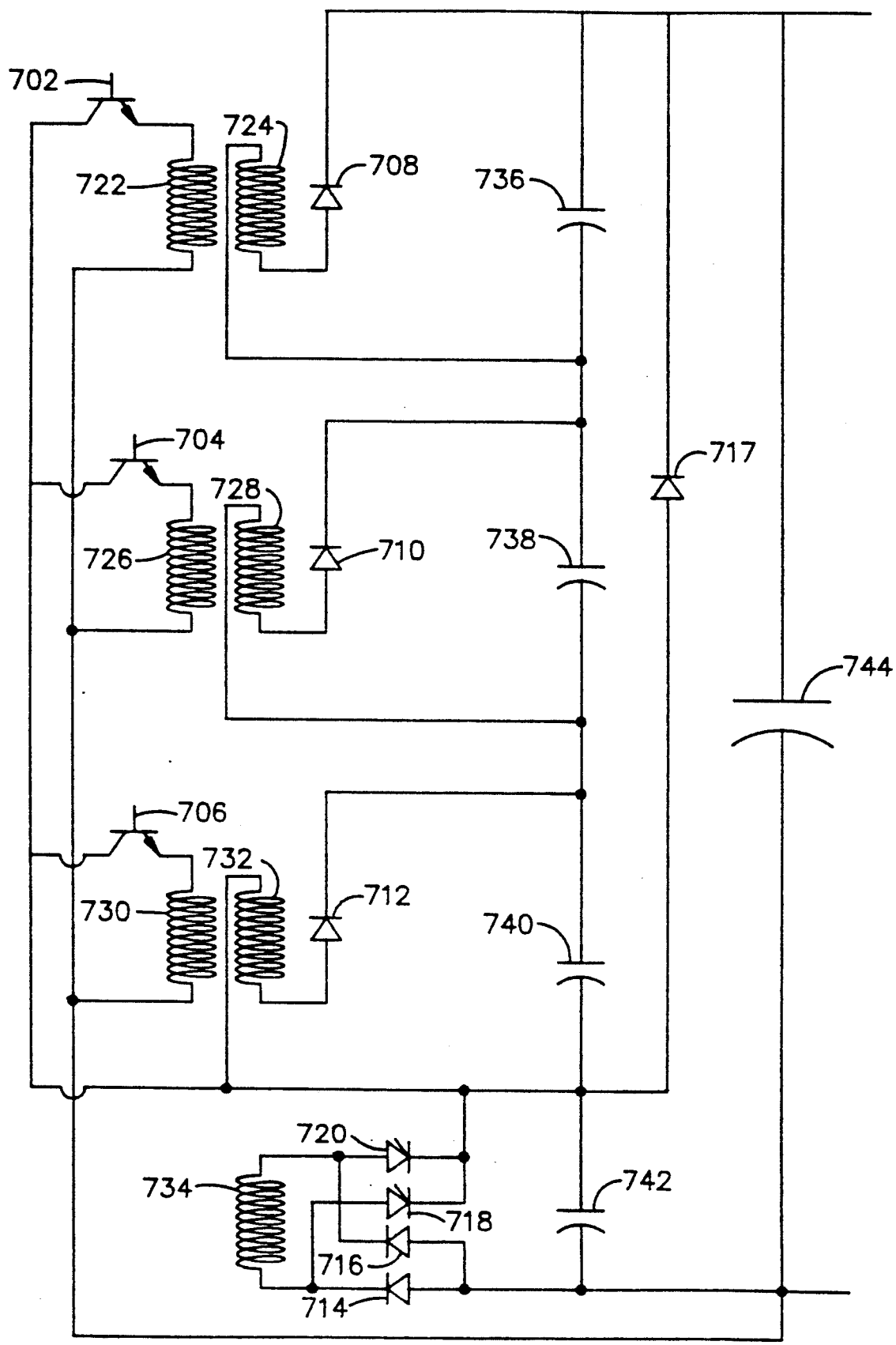
FIG. 7 is a schematic diagram of a voltage control circuit according to one embodiment of the present invention.
Figure 8:
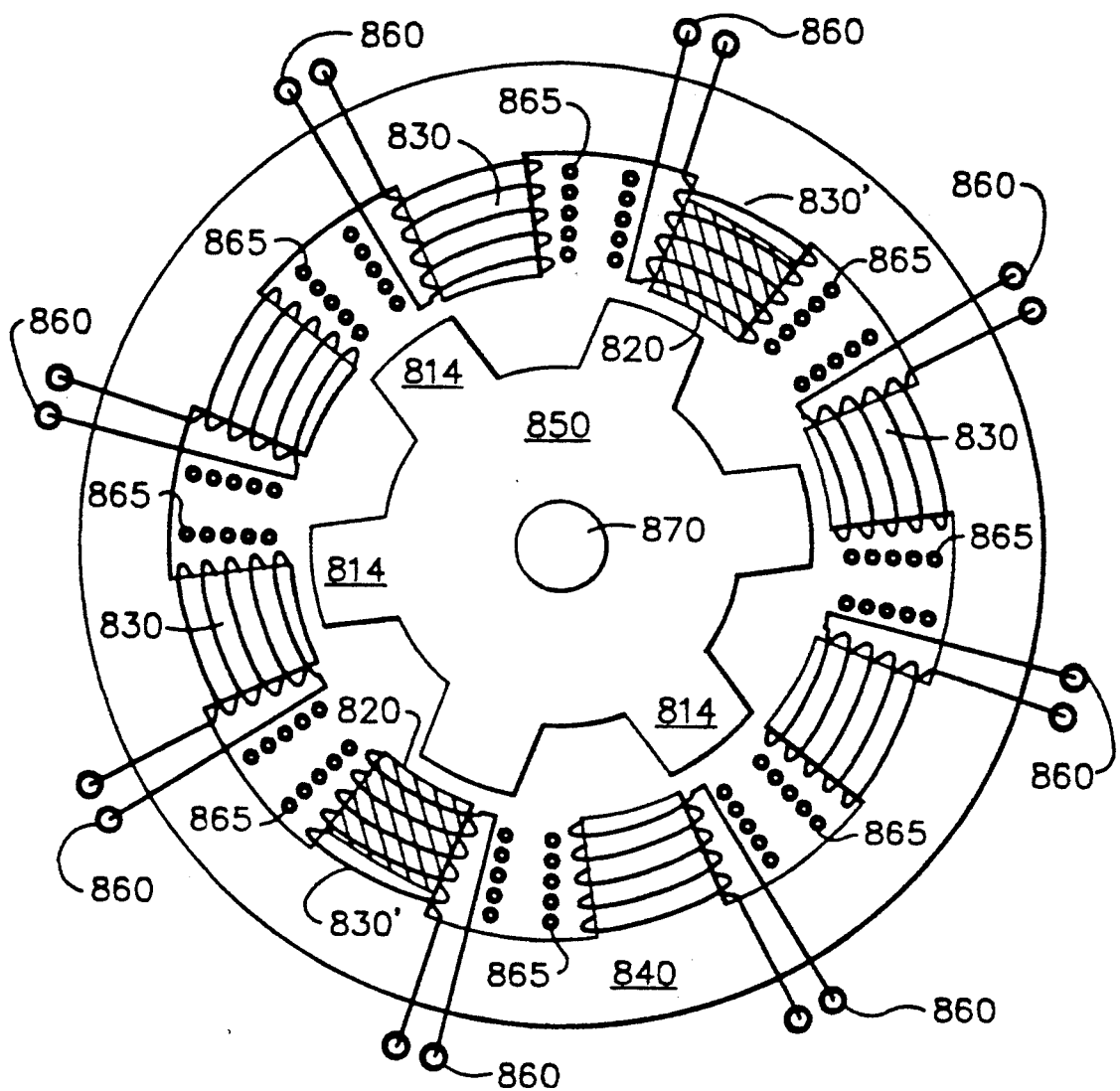
FIG. 8 illustrates a switched reluctance machine including stator magnets according to one embodiment of the present invention.

FIG. 7 illustrates control circuitry adapted to control the embodiment of the invention illustrated in FIG. 8. In FIG. 7, phase windings are wound on the stator teeth in a bifiler fashion to isolate input phase windings 722, 726 and 730 from output phase windings 724, 728 and 732. This arrangement reduces the number of phase switches 702, 704 and 706 required to control the switched reluctance generator. Capacitor 742 is charged through the diode bridge including diodes 714 and 716 and SCRs 718 and 720 by the energy supplied by permanent magnet phase winding 734. Energy from permanent magnet phase winding 734 charges capacitors 736, 738 and 740. Thus, turning on on switch 702, 704 and 706 supplies energy to input phase windings 722, 726 and 730 which is transferred to output phase windings 724, 728 and 732. Energy is added to the system by the reluctance changes resulting from the rotation of the stator of the switched reluctance machine. Energy is transmitted to the output through diodes 708, 710, 712 and 717. Capacitor 744 acts as smoothing capacitor to help maintain a steady output voltage. The output voltage may be controlled by the timing and duty cycle of switches 702, 704 and 706.

FIG. 8 is an illustration of an embodiment of the present invention similar to the machine illustrated in FIG. 1 including bifiler phase windings. In FIG. 8, switched reluctance rotor 850 is mounted on shaft 870. Rotor 870 includes rotor teeth 814. Stator 840 includes stator teeth 830. Stator teeth 830' include permanent magnets 820. In the embodiment of FIG. 8, bifiler windings 865 are wound on windings 860 to form phase windings such as those illustrated in FIG. 7.

Figure 9:
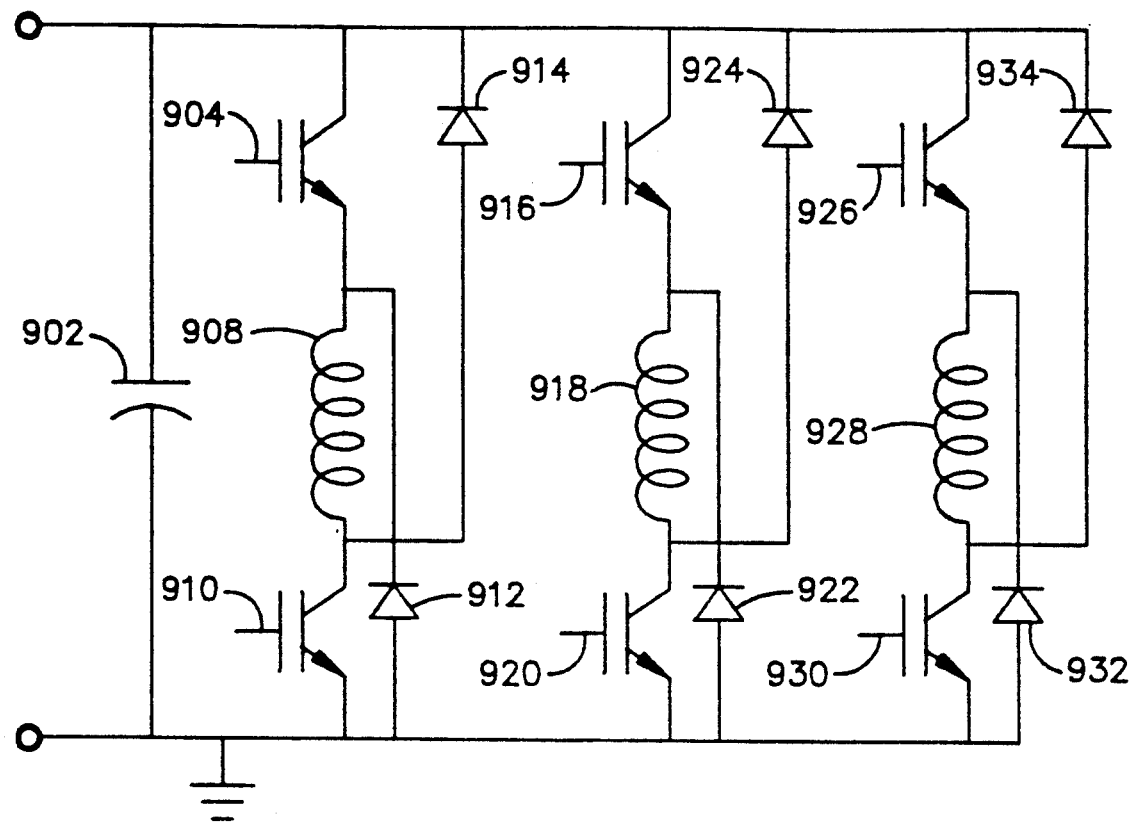
FIG. 9 is a schematic diagram of a conventional voltage control circuit.

FIG. 9 is an illustration of a conventional voltage control circuit adapted to control a conventional switched reluctance machine. In FIG. 9, output capacitor 902 is initially charged by, for example, a battery such that, by turning on switches 904, 910, 916, 920, 926 and 930 current is supplied to phase windings 908, 918 and 928. The phase windings in turn transmit energy to the circuit from the rotating stator and recharge capacitor 902 through diodes 912, 914, 922, 924, 932 and 934 as the rotor turns and the switches are selectively turned off.

Figure 10:
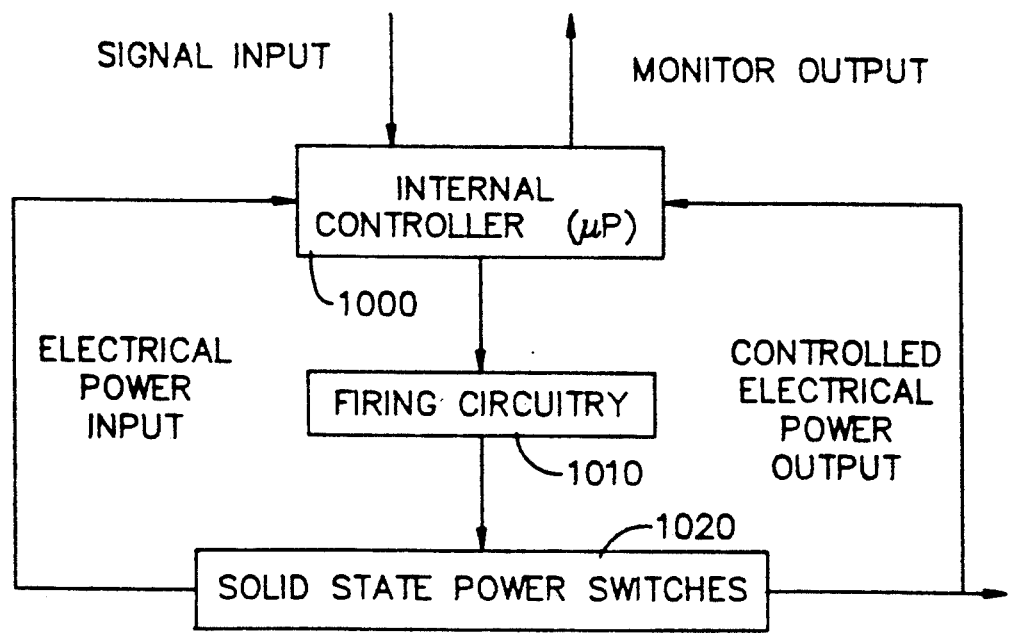
FIG. 10 is a block diagram of a conventional controller for controlling a switched reluctance machine.

FIG. 10 is a block diagram of a conventional controller adapted to control a generator according to the present invention. In FIG. 10, internal controller 1000 controls firing circuitry 1010. Firing circuitry 1010 controls the timing of solid state power switches 1020 which may be, for example, the power switches described herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What we claim is:

1. A switched reluctance machine comprising:
   a rotor including multiple rotor teeth;
   a stator including multiple stator teeth wherein a plurality of the stator teeth comprise permanent magnets.

2. A switched reluctance machine according to claim 1 wherein:
   each of said stator teeth includes a phase winding; and
   said phase windings on said permanent magnet stator teeth are connected to a rectifier bridge.

3. A switched reluctance machine according to claim 2 wherein:
   said rectifier bridge is connected across a switch wherein current from said phase windings charges an output capacitor when said switch is open.

4. A switched reluctance machine comprising:
   a rotor including rotor teeth;
   a stator including stator teeth wherein at least two opposing ones of said stator teeth include permanent magnets;
   phase windings on said stator teeth wherein said phase windings on said permanent magnet stator teeth are connected across a bridge including controllable elements and a switch connected across said bridge.

5. A switched reluctance machine according to claim 4 wherein said bridge comprises:

a first controllable element connected to a first side of said phase winding;

a second controllable element connected to said second side of said phase winding;

a first diode connected to said first side of said phase winding; and a second diode connected to said second side of said phase winding.

6. A switched reluctance machine according to claim 5 wherein:

said controllable elements comprise silicon controlled rectifiers.

7. A switched reluctance machine comprising:

a rotor;

a stator;

a plurality of stator teeth wherein at least two of said stator teeth comprise permanent magnets;

a plurality of windings on said stator teeth wherein said windings on opposing ones of said stator teeth are connected in series to form a phase winding.

8. A switched reluctance machine according to claim 7 wherein:

said phase windings on said permanent magent teeth are connected across a silicon controlled rectifier bridge;

said bridge being connected to a switch.

* * * * *